(12) United States Patent
Nishimura et al.

(10) Patent No.: US 6,996,619 B2
(45) Date of Patent: Feb. 7, 2006

(54) NETWORK SERVICE

(75) Inventors: Shiro Nishimura, Osaka (JP); Taiichi Ohno, Osaka (JP); Katsuya Tanaka, Osaka (JP); Takashi Morita, Osaka (JP)

(73) Assignee: Nippon Pillar Packing Co., Ltd., Osaka (JP)

( * ) Notice: Subject to any disclaimer, the term of this patent is extended or adjusted under 35 U.S.C. 154(b) by 677 days.

(21) Appl. No.: 09/982,638

(22) Filed: Oct. 18, 2001

(65) Prior Publication Data
US 2002/0046282 A1 Apr. 18, 2002

(30) Foreign Application Priority Data
Oct. 18, 2000 (JP) .............................. 2000-317675

(51) Int. Cl.
*G06F 15/16* (2006.01)
(52) U.S. Cl. .................. 709/227; 709/229; 455/456.1; 705/34
(58) Field of Classification Search ................ 709/229; 713/156, 155, 157, 158; 705/44, 65, 34; 455/456.1
See application file for complete search history.

(56) References Cited

U.S. PATENT DOCUMENTS 6,438,690 B1 * 8/2002 Patel et al. ................. 713/156

* cited by examiner

*Primary Examiner*—Kamini Shah
(74) *Attorney, Agent, or Firm*—Koda & Androlia

(57) ABSTRACT

So as to provide a network service that allows a specific service to be provided and received safely for both the user and service provider, a service provider providing a user identification file that is installed in a client computer used by a user whose user eligibility is confirmed in advance. Upon request for access from the client computer, the service provider checks for the presence of a user identification file residing in the client computer in the browser screen and provides a specific service only for access requests from the client computer confirmed to have user identification files. User identification files have no effects on pre-installed programs of the client computer when they are installed and are equipped with computer identification symbols whose presence can be checked in the browser screen.

13 Claims, 3 Drawing Sheets

NETWORK SERVICE

BACKGROUND OF THE INVENTION

1. Field of the Invention

The present invention relates to a network service that allows various services such as purchase orders of items and database use to be received by connecting to a server computer through a network such as the Internet from a client computer.

2. Prior Art

In the past, a variety of services have been provided through compute networks. For example, it is possible for a user to receive specific services such as ordering and purchasing items or using and viewing databases by accessing the home page of a service provider through the Internet from a personal computer or the like used by the user.

In this type of network service, a specific service is provided on a specific Web page (hereafter referred to as "user-only screen") linked to a home page. To prevent illegal item orders, use of databases, and the like, the service provider requests user information that enables confirmation of the user's eligibility such as confidential information unique to the user (e.g., the user's address, name, age, occupation, place of employment, position, gender, telephone number, fax number, email address, or credit card number) or a user ID (identification) and password set up with the service provider; and only when this user information is entered, access to the user-only screen is permitted.

There is the danger, however, that user information such as that discussed above could be intercepted by another person on the network and illegally used, causing great damages. Confidential information unique to the user such as the credit card numbers are particularly effective and convenient for the service provider to confirm eligibility of completely unknown users, but the harm suffered by a user by its illegal acquisition and use by another person can be extremely severe. Naturally, harm suffered by the service provider can also be quite severe, including damage to databases when other parties access them using illegally acquired user information.

In prior art, a variety of security systems have been proposed, including use of complex encryption keys to authenticate access rights. However, it is difficult to prevent leaks of user information provided on the network in the course of authenticating access rights by identifying the user (person) on the network. Furthermore, highly sophisticated security systems that can effectively prevent user information from being intercepted are extremely labor-and-cost intensive to develop and to build their infrastructures. Thus, ordinary service providers who do not have sufficient financial means cannot adopt such systems at all.

SUMMARY OF THE INVENTION

Accordingly, the object of the present invention is to provide a network service that allows specific services to be provided and used with safety for both the user and service provider without causing such problems as those seen in the prior art network systems.

The above object is accomplished by a unique network service system of the present invention wherein a service provider provides to a user whose user eligibility has been confirmed in advance a user identification file that can be installed in a client computer which the user is using; and when there is an access request from the client computer, the service provider checks in a browser screen whether there is a user identification file residing in the client computer and then provides a specific service only to access requests from client computers on which it has been confirmed that a user identification file resides.

In other words, in the present invention, authentication of access rights in the network service is not accomplished by identifying a user (person); rather, authentication of access rights is done by identifying the client computer itself, thus not using confidential information unique to the user as an authentication condition for access request.

In the above system, the specific services include services provided through the Internet (WWW (World Wide Web), etc.). For example, the specific services include ordering and purchasing of: physical goods and products that are shipped upon ordering and purchasing of items by ordinary delivery means (express mail, regular mail, courier, etc.); and electronic products (digital data, application software, music data, etc.) that are sent (via downloading, etc.) by electronic means (Internet, email, etc.). The specific services further include use of database information (inventory information about items, etc.). The specific services also include services provided through networks other than the Internet, such as WAN (Wide Area Network), for instance.

Information about the user identification files is held in a cookie, and the information held in the cookie is erased when the connection to the network ends (for example, when access of a home page ends). Thus, the information is prevented from being intercepted on the network.

In the network service of the present invention, the user identification file has no effect on the existing or pre-installed programs on the client computer when the user identification file is installed. Also, the user identification file is equipped with computer identification symbols whose existence can be confirmed in the browser screen.

The computer identification symbols are, in concrete terms, an array of a plurality of ASCII (American Standard Code for Information Interchange) characters and give an individual identity to the computer on which the user identification file is installed.

The user identification file is stored on a magnetic medium such as a diskette and CD-ROM and provided to a user by the service provider. The magnetic medium is given to users by ordinary delivery means (mail, etc.) or by the service provider (including an employee working for the service provider, a specific dealer entrusted by the service provider, etc.) who directly visit users.

When there is a service use contract between a service provider and a user (for example, an agency contract), then the confirmation of user eligibility is accomplished at the time of agreement (or at the time of signing) of such a contract.

When the user identification file is stored on a magnetic medium and provided to users as described above, the act of providing the magnetic medium itself functions as a confirmation of user eligibility. In other words, when a magnetic medium is delivered by ordinary delivery means such as mail, the user's address, name, and the like are confirmed by completion of the delivery, and the delivery completion confirms the user eligibility. When the service provider visits users and provides them with a magnetic medium, the service provider can interview a particular user and reliably evaluate the user eligibility in this way just as in the case of service use contract.

The user identification file is installed by a user whose user eligibility is confirmed or by the service provider on one or a plurality of computers that the user intends to use for the network service. The installation is performed using the magnetic medium by the user or by the service provider. When the service provider install the user identification, the installation can be performed when the service use contract is reached or when the magnetic medium is provided. Because the service provider can also confirm user eligibility by talking directly to the user, installation by the service provider is naturally preferable in cases where the user has little knowledge of computers and it is difficult for the user to do the installation. Even in other cases, installation by the service provider is preferable from the standpoint of user eligibility confirmation.

Furthermore, depending on the content of the service or the user eligibility, it is preferable to limit the number of computers on which the installation is to be made. When there are such restrictions, the service provider retrieves the magnetic medium, on which the user identification file is stored, after the installation. The user identification file (and particularly the computer identification symbols) can be the same for all users who use the service through the network service or a plurality of grouped users. In such cases, it is preferable to change the version of the user identification file (change the computer identification symbols) periodically for security reasons.

Incidentally, it is sometimes desirable to customize the user-only screen, which is a screen through which the service is provided, for each user or each group of users when it is necessary to provide service tailored to needs of individual users in the network service.

In such cases, it is possible to request the user to input user information as a condition to log into the user-only screen for using the specific service in addition to installing the user identification file. This user information does not include confidential information unique to the user (such as user's annual income, credit card numbers) whose disclosure on the network would be detrimental to the user, but is generally either or both of a user ID and/or password given by the service provider. The user-only screen can be customized to the user by this user ID and allow service to be specifically tailored to each individual user.

In the above situation, confirmation of the presence of the user identification file (computer identification symbols) is initiated upon the operation of logging into the user-only screen from the user information entry screen. The server computer compares the entered user information (user ID, etc.) with the user information stored in its database only when it has confirmed the existence of the user identification file. Once the server computer has found a match, it permits logging into the user-only screen from the screen for entering authentication information. In other words, a match for the user information such as the user ID is confirmed after checking for the presence of a user identification file. Thus, security is assured by reliably refusing requests even in the case in which the user information is intercepted on the network and an illegal access request is made using that user information.

DETAILED DESCRIPTION OF THE INVENTION

Figure 1:
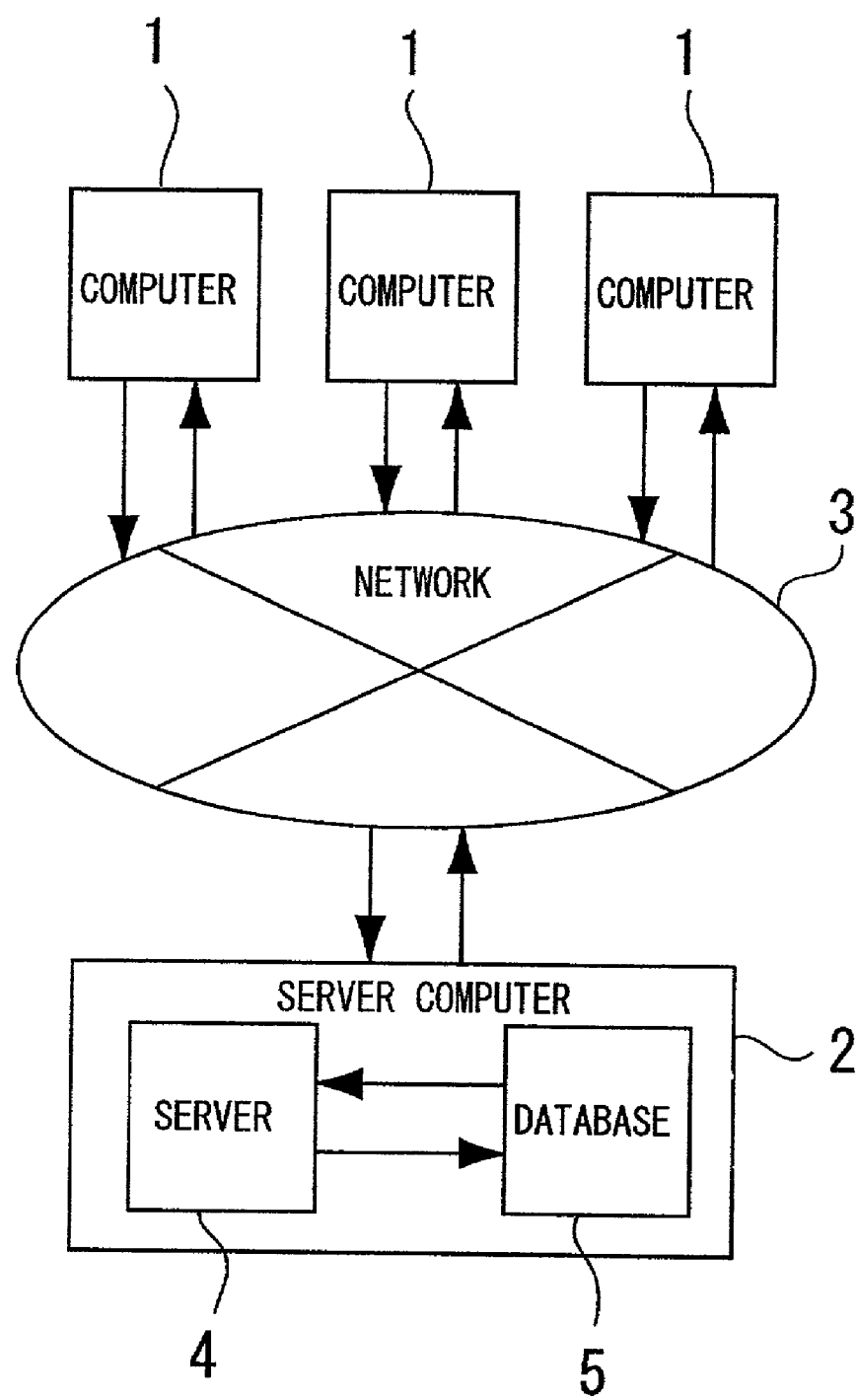
FIG. 1 is a block diagram of system architecture for implementing the network service according to the present invention.

As shown in FIG. 1, the network service according to one embodiment of the present invention is conducted by a client-server system that connects a client computer 1 belonging to a user to a server computer 2 belonging to and controlled by a service provider via a network (Internet) 3.

The client computer 1 is a non-mobile computer (desktop computer, etc.) or mobile terminal (notebook computer, etc.) owned by the user. It is equipped with a World Wide Web browser (such as [MICROSOFT INTERNET EXPLORER] and [NETSCAPE NAVIGATOR]), a monitor, and the like. The client computer 1 displays desired images on the monitor by sending a specific URL (Uniform Resource Locator) to the Internet 3 and obtaining resources (hypertext) specified by this URL.

The client computer 1, which can use specific services through the network service, has a user identification file that contains computer identification symbols, as will be described later, installed therein. Hereafter, when it is necessary to distinguish a computer on which a user identification file is installed from a computer on which no such file is installed, the former is referred to as a "specified computer," and the latter will be called an "unspecified computer." User information (IDs and passwords) is presented from the service provider to the user who uses a specified computer (hereafter, such a user is called a "specified user" when it is necessary to distinguish this user from one who uses an unspecified computer).

The service provider can limit the number of specified computers 1 authorized for a single user; in some cases; however, the user may be permitted to make any settings without restriction according to the conditions set for the service use. This is because there are cases in which, for example, a user wishes to use a computer at headquarters as well as computers at branches and sales offices that are not connected to it through a WAN or the like as specified computers, or user's employees wish to access it using mobile terminal such as notebook computers from random locations.

The server computer 2 is a computer system equipped with a WWW server 4, a database 5 and the like. As necessary, it can include a network system using a LAN (Local Area Network) or WAN. The server 4 is connected to the Internet 3 and equipped with home page display files. The server computer 2 also, as necessary, can have ordinary security systems (such as firewalls) installed in it.

Home page display files are comprised of programs that handle transmission to a browser of home pages consisting of a hierarchy of multiple levels of Web pages (user information entry screens, user-only screens, etc.), acquisition and storage of computer identification symbols, distinction of computer identification symbols, and comparison and confirmation of user information.

With regard to the acquisition and storage of computer identification symbols, when the specified computer 1 accesses the home page, computer identification symbols provided to the computer 1 are automatically acquired via the user identification file and tacitly stored in the browser screen using a cookie function.

Computer identification symbols are distinguished by ascertaining whether the computer identification symbols have been acquired and stored in the browser screen. User information is compared and confirmed by comparing user IDs and passwords, which are user information input by the user, with database information (user information relating to IDs and passwords stored in the database 5) when the existence of computer identification symbols is confirmed, and access to the database 5 is permitted from the user-only screen when the two match.

A user identification file provided by the service provider is installed in the specified computer 1. This user identification file is stored on an appropriate magnetic medium such as a diskette (floppy disk) or CD-ROM. Thus, the user identification file is installed in the specified computer 1 using such magnetic medium.

The user identification file includes computer identification symbols (a text file), in which an appropriate number of ASCII characters are arrayed, and a dynamic link library (DLL), which reads the computer identification symbols in the browser screen. In addition to the user identification file, the magnetic medium may, as necessary, include installation wizard programs for incorporating the file onto the specified computer.

User identification files function to provide unique computer identification symbols (authentication symbols) for distinguishing the specified computer 1 from other computers (i.e., unspecified computers). Installation of the user identification files has no effect on existing, pre-installed programs (such as the operating system ([WINDOWS 98], [MS-DOS], [OS/2], etc.) and application programs) on the computer 1. The user identification file is stored and held in a directory or file (for example, a system file) that is not used for file operations conducted by the user.

Installation of the user identification file in the specified computer 1 is as a rule performed by the service provider. This allows the service provider to confirm user eligibility as well as to prevent illegal use of the magnetic medium. In other words, by visiting the user and installing the user identification file on the computer 1 which the user will use, the service provider directly determines whether or not the user is the one who has qualifications (user eligibility) to be a specified user (whether or not the person is able to appropriately use the network service). This ensures safety for future electronic commercial transactions and the like.

When the user is assured to be a person who can be trusted by conclusion of a service use contract such as an agency contract, the magnetic medium is shipped to the user by ordinary delivery means such as mail or express mail; and the user installs the user identification file by himself. In this case as well, if the user is unfamiliar with computer operations, the service provider installs the user identification file upon a request of the user.

Figure 2:
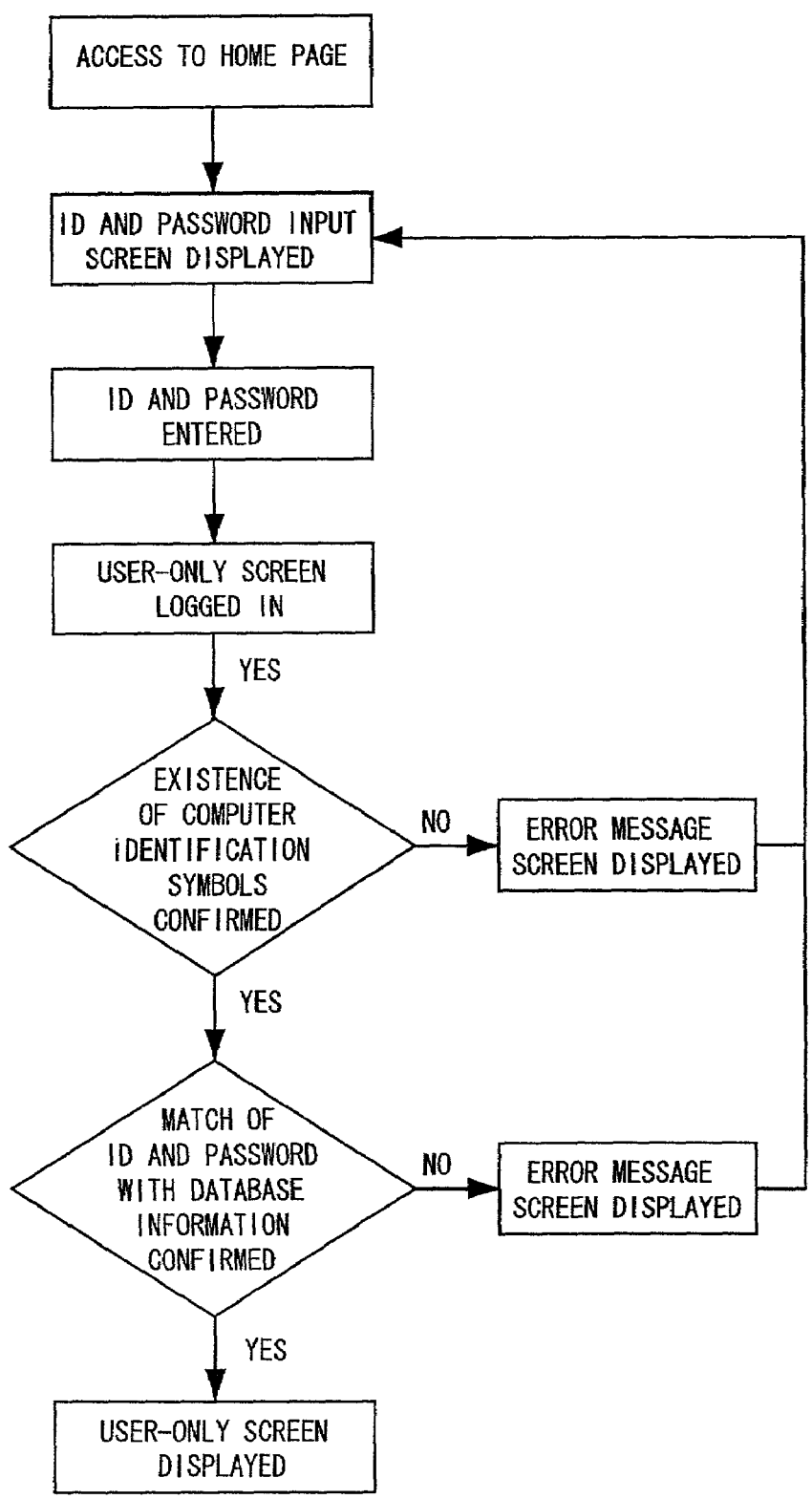
FIG. 2 is a flowchart of the network service according to one embodiment of the present invention.

With the network service according to the present invention as described above, specific services (product ordering, inventory inquiries, and other services that use databases) are provided to specified users using routines as shown in FIG. 2.

More specifically, in use, a Web browser is started up on the specified computer 1 on which a user identification file is installed, the home page of the service provider is accessed, and the home page screen is displayed on the monitor of the specified computer. The home page screen has a login button for the user-only screen, which displays the user information entry screen when clicked.

The specified user enters the user ID and password provided by the service provider in advance in this entry screen. By clicking the login button shown in the entry screen, the user-only screen that is customized according to the user ID entered is displayed, and access to the database 5 is permitted.

At this time, logging into the user-only screen is conducted only for accesses by the specified computer 1 on which the user identification file is installed. Accesses from unspecified computers are rejected.

In other words, when an operation to log into the user-only screen is performed from the user information entry screen (i.e., the login button is clicked), the presence of computer identification symbols in the computer 1 is ascertained and confirmed in the browser screen. The server computer 2 compares the entered user ID and password with the user information stored in the database 5 once it has confirmed the existence of the computer identification symbols. When they match, then the user-only screen is displayed, and access to the database 5 is permitted.

The user-only screen is customized according to the user ID and has one or a plurality of sections that the specified user desires. For example, it might have a product ordering section, inventory information section, a shipment information section for ordered products, and a database download section.

However, when the entered user ID or password does not match the database information, an appropriate error message screen is displayed, and logging into the user-only screen is denied.

When an unspecified computer requests an access to a user-only screen, no computer identification symbols are confirmed in the browser screen, an appropriate error message screen is displayed, and logging into that user-only screen is denied. In this case, the entered user information is not compared with the database information. In other words, the pieces of information are only compared when the presence of appropriate computer identification symbols is confirmed.

Consequently, even when accesses are attempted simultaneously from numerous computers 1, including a plurality of unspecified computers, processing demanded of the server computer 2 (load on the server 4) is reduced compared to cases in which entered user IDs and passwords are compared with database information to determine conformance for all accesses, including illegal accesses (which include accesses using intercepted user information such as user IDs and passwords that are appropriate from a format perspective). As a result, there is no need to install a greater server capacity than necessary. Thus, the server computer 2 can be made smaller and keep the cost less.

Incidentally, the user ID and password can be distinguished by looking at the URL specification line of the browser, the status bar, and also the source code. Thus, it is easy for someone knowledgeable about HTML commands to acquire user IDs and passwords, which creates a danger of illegal accesses by other people.

Nevertheless, as described above, in the present invention, user IDs and passwords are checked for correctness only for accesses from the specified computers 1 on which the existence of computer identification symbols is confirmed, and logging into the user-only screen and access to the database 5 are denied if access is made from an unspecified computer even if user IDs and passwords are correct. Therefore, there is no unforeseen harm to the service provider or user even should a user ID and password be stolen.

Furthermore, the user IDs and passwords can only be used in the particular network service. Thus, unlike confidential information unique to the user, there is no damage to the user (specified user) by illegal use in other network services.

Furthermore, in the present invention, when it is confirmed that computer identification symbols are present, the confirmation information is stored in a cookie and continues to be stored as long as the computer is connected to the home page, including the user-only screen. Consequently, even when logging on to and off of the user-only screen are repeated, it is possible to avoid the trouble of having to confirm the computer identification symbols each time. However, for security reasons, the information held in the cookie is erased when the connection to the home page is terminated (or when the browser goes offline).

Incidentally, because the computer identification symbols are a simple text file that is an array of ASCII characters, the file does not stand out unlike special files such as encryption files. Therefore, it does not arouse attention even if the specified computer 1 be illegally invaded via the network, making the danger of hacking extremely small. Thus, individualization of the computer 1 via computer identification symbols can be an extremely effective access right authentication means in terms of security.

As described above, in the present invention, the right to access to the user-only screen in the network service is not authenticated by identifying the user (person) based on user information such as confidential information unique to the user. Instead, the right to access to the user-only screen in the network service of the present invention is authenticated by individualizing a computer that the user uses based on computer identification symbols residing inside the computer. Therefore, there is no danger of the user information being intercepted on the network nor unexpected damage caused to the user. Moreover, a safe network service can be created and executed for the service provider as well, since in the present invention illegal access can be reliably prevented, and damages caused by illegal intrusions or the like into the database can be reliably eliminated Incidentally, use of an IC card reader is another possible means to execute authentication access rights by way of individualization of a computer. However, this system requires installation of an IC card reader in every single computer to which access rights are requested, resulting in a problem of increase of initial costs for using network service. In particular, depending on the user's needs and the service content, the user may need to access the service from a plurality of computers that the user owns. In such a case, the economic burden magnifies since each of the computers needs to be installed with an IC card reader.

In the network service of the present invention, however, all that needs to be installed is a user identification file on the computer to be used. No special device other than a magnetic medium (CD, for instance) that stores the user identification file is needed. The system architecture required for authenticating access rights (determining whether there are computer identification symbols) is simple and easy and can fully meet user's needs without imposing a heavy economic burden. Furthermore, once the user identification file is installed, there is no need for an operation at every access, as there would be in the system that uses IC card readers. The service can also be received at any location easily in cases where a notebook computer or similar mobile terminal is used as the specified computer 1 of the present invention.

The present invention is not limited to the embodiments described above. Other improvements and modifications are in the scope of the present invention so long as they do not depart from the basic principles of the present invention.

In particular, user information such as user IDs and passwords is necessary in order to, for instance, customize user-only screens; but this type of information is easy to intercept on a network as described above and is not very important in terms of ensuring security of the network service. For that reason, in cases where the service provided (the constitution of user-only screens) is uniform and does not require customization for each user, etc., there is no need to require entry of user information such as user IDs and passwords, and access rights can be authenticated unconditionally for access requests from a computer 1 installed with a user identification file.

Figure 3:
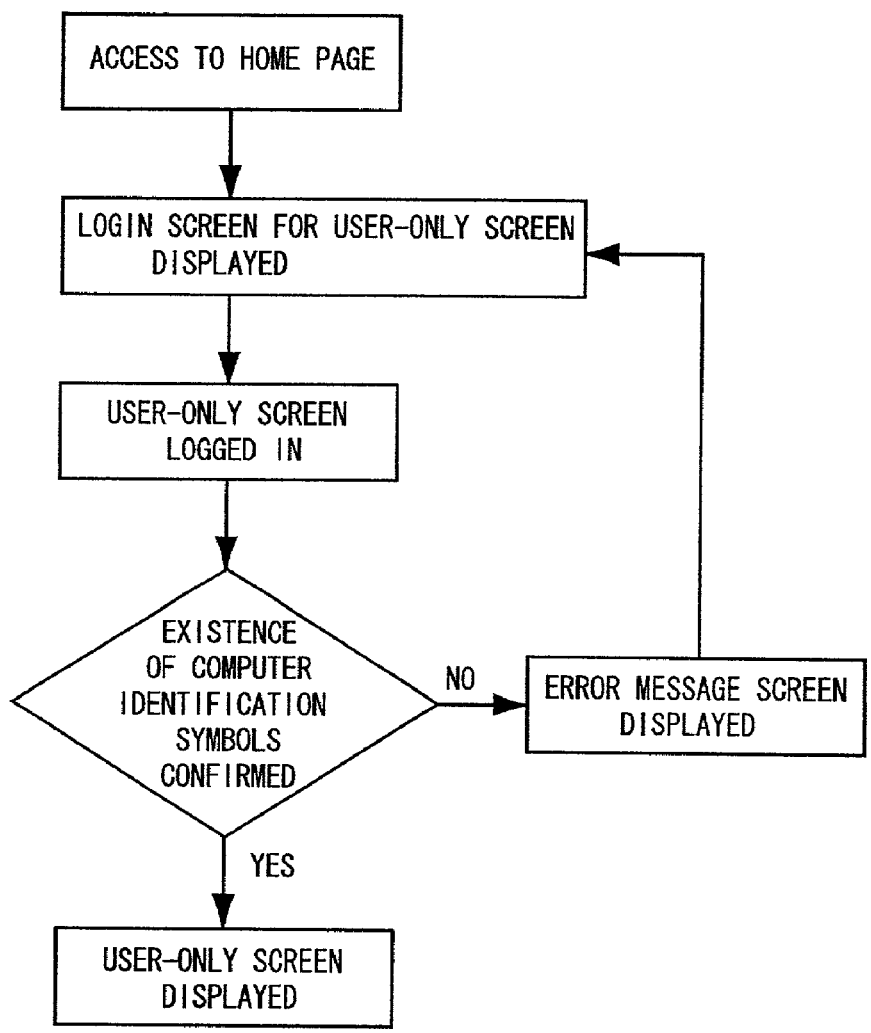
FIG. 3 is a flowchart of network service according to another embodiment of the present invention.

For example, as seen from FIG. 3, when the operation to log into the user-only screen is performed (by clicking the login button on the login screen, for example), the presence of computer identification symbols is confirmed in the browser screen. If it is confirmed that computer identification symbols are present, logging into the user-only screen and access to the database are permitted. In this case, the computer identification symbols are held in a cookie, and such held information is erased when the connection to the home page terminates. On the other hand, if the presence of computer identification symbols is not confirmed, an error message screen is displayed, and the access is refused.

The present invention can be applied when using a closed network such as an intranet or extranet or when ensuring security on a LAN or WAN.

As seen from the description above, according to the present invention, network services are provided and received safely. Furthermore, because complex and expensive security systems are not required, it is possible to build system architecture for a network service easily and inexpensively.

The invention claimed is:

1. A network service wherein:
a service provider provides to a user whose user eligibility has been confirmed in advance a user identification file that can be installed in a client computer that said user is using, and
upon an access request from said client computer, said service provider checks in a browser screen whether there is a user identification file residing in said client computer, wherein
a specific service is provided only to access requests from a client computer on which a user identification file is confirmed to be present,
said service provider installs said user identification file on one or plurality of computer owed by said user, and
said confirmation of user eligibility is conducted when said user identification file is installed by said service provider, and
said user eligibility is confirmed upon agreement of a service use contract between said service provider and said user, and
said service use contract is agency contract.

2. The network service according to claim 1, wherein said user identification file has no effects on existing programs on said client computer when installed, said user identification file being equipped with computer identification symbols that allow confirmation of existence of said user identification tile in said browser screen.

3. The network service according to claim 2, wherein said computer identification symbols are comprised of an array of a plurality of ASCII characters.

4. The network service according to claim 1, wherein said service provider provides said user with said user identification file stored on a magnetic medium.

5. The network service according to claim 1, wherein said user installs said user identification tile on one or a plurality of computers that said user owns.

6. The network service according to claim 4, wherein provision of said magnetic medium to said user is conducted by an ordinary means of delivery, and said user eligibility is confirmed upon completion of delivery to said user of said magnetic medium.

7. The network service according to claim 4, wherein said service provider provides said magnetic medium and confirms said user eligibility by visiting said user.

8. The network service according to claim 1, wherein said service provider provides user identification files having the same content therein to all users or a plurality of users to whom said service provider intends to authorize access rights.

9. The network service according to claim 1, wherein entry of user information that includes no confidential information unique to a user is requested as a condition for logging into a user-only screen for use of a specific service.

10. The network service according to claim 9, wherein said user information is a user ID and/or password provided by said service provider.

11. The network service according to claim 9, wherein confirmation of presence of computer identification symbols is initiated upon operation of logging into a user-only screen from an entry screen of said user information.

12. The network service according to claim 9, wherein only when presence of computer identification symbols is confirmed, an entered user information is compared with user information stored in a database and then correspondence of said user information is confirmed, thus allowing login to said user-only screen from said entry screen of said authentication information.

13. The network service according to claim 1, wherein information in said user identification file is held in cookie, and information held in said cookie is erased when connection to said network terminates.

* * * * *